United States Patent
Deamo et al.

(10) Patent No.: US 9,760,977 B2
(45) Date of Patent: Sep. 12, 2017

(54) METHOD AND APPARATUS FOR GENERATING A SUPER-RESOLVED IMAGE FROM A SINGLE IMAGE

(71) Applicant: THOMSON LICENSING, Issy de Moulineaux (FR)

(72) Inventors: Alberto Deamo, Barcelona (ES); Axel Kochale, Springe (DE); Jordi Salvador Marcos, Hamburg (DE)

(73) Assignee: THOMSON LICENSING, Issy-les-Moulineaux ( * ) Notice: Subject to any disclaimer, the term of this patent is extended or adjusted under 35 U.S.C. 154(b) by 66 days.

(21) Appl. No.: 14/780,549

(22) PCT Filed: Mar. 26, 2014

(86) PCT No.: PCT/EP2014/056098
§ 371 (c)(1),
(2) Date: Sep. 27, 2015

(87) PCT Pub. No.: WO2014/154773
PCT Pub. Date: Oct. 2, 2014

(65) Prior Publication Data
US 2016/0063677 A1    Mar. 3, 2016

(30) Foreign Application Priority Data

Mar. 27, 2013 (EP) ..................................... 13305381
Jun. 18, 2013 (EP) ..................................... 13305821

(51) Int. Cl.
*G06K 9/40* (2006.01)
*G06T 3/40* (2006.01)
(Continued)

(52) U.S. Cl.
CPC .......... *G06T 3/4053* (2013.01); *G06K 9/6215* (2013.01); *G06T 3/4092* (2013.01);
(Continued)

(58) Field of Classification Search
CPC ... G06T 3/4053; G06T 7/0042; G06T 3/4092; G06T 7/0085; G06T 2207/20201; G06K 9/6215; G06K 2009/6213
(Continued)

(56) References Cited

U.S. PATENT DOCUMENTS 7,352,918 B2 * 4/2008 Tannhof ................ G06T 3/4046
                                                      382/156
8,411,940 B2 * 4/2013 Dauw ................... G06K 9/4652
                                                      382/162

(Continued)

FOREIGN PATENT DOCUMENTS

WO    WO2010122502    10/2010

OTHER PUBLICATIONS

Glasner et al. "Super-Resolution from a Single Image", Computer Vision, 2009 IEEE 12th International Conference, Sep. 29-Oct. 2, 2009; pp. 1-8.

(Continued)

*Primary Examiner* — John Strege
(74) *Attorney, Agent, or Firm* — Tutunjian & Bitetto, P.C.

(57) ABSTRACT

Known methods for generating super-resolved images from single input images have various disadvantages. An improved method for generating a super-resolved image from a single low-resolution input image comprises up-scaling the input image to generate an initial version of the super-resolved image, searching, for each patch of the low-resolution input image, similar low-resolution patches in first search windows within down-sampled versions of the input image, and determining, in less down-sampled versions of the input image, high-resolution patches that correspond to the similar low-resolution patches. The determined high-resolution patches are cropped, a second search window is determined in the initial version of the super-
(Continued)

resolved image, and a best-matching position for each cropped high-resolution patch is searched within the second search window. Finally, each cropped high-resolution patch is added to the super-resolved image at its respective best-matching position.

12 Claims, 5 Drawing Sheets

(51) Int. Cl.
    *G06K 9/62*     (2006.01)
    *G06T 7/73*     (2017.01)
    *G06T 7/13*     (2017.01)

(52) U.S. Cl.
    CPC .................. *G06T 7/13* (2017.01); *G06T 7/73* (2017.01); *G06K 2009/6213* (2013.01); *G06T 2207/20201* (2013.01)

(58) Field of Classification Search
    USPC ........................................................ 382/298
    See application file for complete search history.

(56) References Cited

U.S. PATENT DOCUMENTS

| | | | |
|---|---|---|---|
| 2004/0218834 A1* | 11/2004 | Bishop | H04N 19/587 382/299 |
| 2011/0050991 A1* | 3/2011 | Bellers | H04N 7/0127 348/441 |
| 2011/0206296 A1* | 8/2011 | Sakaguchi | G06T 3/4053 382/299 |
| 2012/0086850 A1* | 4/2012 | Irani | G06T 3/4053 348/441 |
| 2012/0328210 A1* | 12/2012 | Fattal | G06T 3/403 382/264 |
| 2013/0028538 A1* | 1/2013 | Simske | 382/300 |
| 2013/0034313 A1* | 2/2013 | Lin | G06T 3/4053 382/299 |
| 2013/0223734 A1* | 8/2013 | Tuzel | G06T 3/4053 382/167 |
| 2015/0154739 A1* | 6/2015 | Choudhury | G06T 5/00 382/266 |

OTHER PUBLICATIONS

Yang et al. "Image Super-Resolution via Sparse Representation" IEEE Trans. on Image Processing, vol. 19, issue 11, pp. 2861-2873.
Dong et al., "Sparse representation based image interpolation with nonlocal autoagressive modeling", IEEE Transactions on Image Processing, Piscataway, US, vol. 22, No. 4, Apr. 1, 2013, pp. 1382-1394.
Salvador et al., "Patch-based spatio-temporal super-resolution for video with non-rigid motion", Signal Processing: Image Communication, May 1, 2013, pp. 1-12.
Yang et al., "Exploiting self-similarities for single frame super-resolution", Computer Vision A ACCV, Springer, Berlin, Nov. 8, 2011, pp. 497-510.
Search Report Dated July 15, 2014.

* cited by examiner

METHOD AND APPARATUS FOR GENERATING A SUPER-RESOLVED IMAGE FROM A SINGLE IMAGE

This application claims the benefit, under 35 U.S.C. §365 of International Application PCT/EP2014/056098, filed Mar. 26, 2014, which was published in accordance with PCT Article 21(2) on Oct. 2, 2014 in English and which claims the benefit of European patent application No. 13305381.9, filed Mar. 27, 2013 and European patent application No. 13305821.4, filed Jun. 18, 2013.

FIELD OF THE INVENTION

This invention relates to a method and an apparatus for generating a super-resolved image. In particular, the super-resolved image is generated from a single low resolution image.

BACKGROUND

Super-resolution upscaling of a single noiseless input image by exploiting multi-scale self-similarities is generally known.

Dictionary-based super-resolution methods (J. Yang, J. Wright, T. Huang, and Y. Ma, *Image Super-resolution via Sparse Representation*, IEEE Trans. on Image Processing, pp. 2861-2873, vol. 19, issue 11, May 2010) use an example dictionary created from a representative collection of training images. It is therefore necessary to adapt the dictionary to the kind of contents in the image to be super-resolved. Creating a dictionary can take from several minutes to hours, so the classes of images that can be super-resolved must be defined in advance.

In contrast, single-image super-resolution methods (D. Glasner, S. Bagon, and M. Irani, *Super-Resolution form a Single Image*, ICCV 2009) can exploit multi-scale self-similarities for finding examples at different scales of the image. One important drawback of this approach (and related techniques based on the same principle) is that the combination of overlapping patches obtained from within the image leads to incompatibilities between the lower spectrum of the super-resolved image and the input image. This is solved using iterated back-projection (IBP), which introduces other artifacts, such as ringing. Moreover, this method only considers linear combinations of example patches (weighted average) when reconstructing the super-resolved image.

The inventors' prior work on single-image super-resolution exploiting the cross-scale self-similarity property was able to avoid using IBP by introducing high-frequency examples complementing the interpolation-based up-scaled version of the input image. A drawback is that high-resolution versions of image structures at different scales cannot be gained. Generally, the methods mentioned above provide only partial solutions for generating super-resolved images.

SUMMARY OF THE INVENTION

The present invention improves the generation of super-resolved images from single input images.

In principle, an improved method for generating a super-resolved image from a single low-resolution input image comprises steps of constructing examples, performing multi-scale analysis and reconstructing the super-resolved image.

In an embodiment, an improved method for generating a super-resolved image from a single low-resolution input image comprises upscaling the input image to generate an initial version of the super-resolved image, searching, for each patch of the low-resolution input image, similar low-resolution patches in first search windows within down-sampled versions of the input image (i.e. versions that are down-sampled with first down-sampling factors), and determining, in less down-sampled versions of the input image (i.e. in versions that have higher resolutions than those down-sampled with the first down-sampling factors), high-resolution patches that correspond to the similar low-resolution patches. The determined high-resolution patches are cropped, a second search window is determined in the initial version of the super-resolved image, and a best-matching position for each cropped high-resolution patch is searched within the second search window. Finally, each cropped high-resolution patch is added to the super-resolved image at its respective best-matching position, wherein a weighted combination of the cropped upscaled patches to the initial super-resolved image is generated.

In an embodiment, the adding comprises either accumulating pixel information of the cropped upscaled patches and pixel information of the initial super-resolved image, or replacing pixels of the initial super-resolved image by pixels of the cropped upscaled patches. In both cases, if pixels from a plurality of cropped upscaled patches contribute to a pixel of the super-resolved image, the contributing plurality of pixels are averaged. Pixel information is e.g. luminance/chrominance, or luminance/chrominance of a pixel of only HF or LF portions of a patch.

A methods according to the invention are disclosed in claim 1. An apparatus according to the invention is disclosed in claim 6.

In one aspect, the invention relates to a computer readable storage medium having executable instructions to cause a computer to perform a method as disclosed in claim 1 or claim 2.

An advantage of at least some embodiments of the invention is that multi-scale super-resolution is possible without introducing additional ringing. This is because the contribution of the high-frequency examples is accurately placed by introducing a second level of search in the destination layer.

Advantageous embodiments of the invention are disclosed in the dependent claims, the following description and the figures.

BRIEF DESCRIPTION OF THE DRAWINGS

Exemplary embodiments of the invention are described with reference to the accompanying drawings, which show in FIG. 1 a flow-chart of a method according to the invention.

DETAILED DESCRIPTION OF THE INVENTION

The present invention provides a mechanism to introduce high-resolution example patches from different scales, partly similar to the method described by Glasner et al. However, the present invention does not require the applying of iterated back-projection (IBP). Known methods require IBP to ensure the consistency of the lower part of the spectrum. According to at least some embodiments of the invention, IBP can be avoided by reconstructing the high-frequency band of the super-resolved image at progressively larger scales and adding it to the interpolation-based low-frequency band. By doing so, it is ensured that the interpolation-based low-frequency band remains consistent with that of the input image in each scale.

Figure 1:
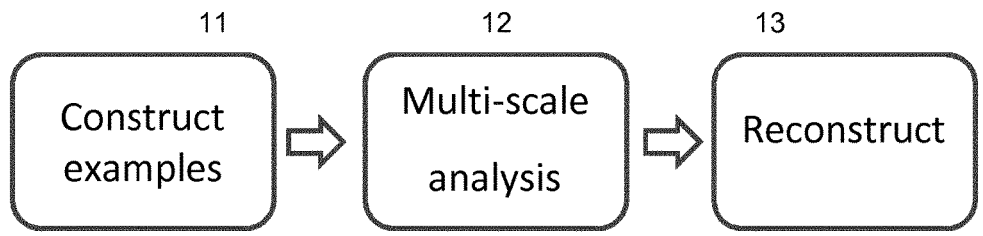

Main steps of a method according to the present invention, as shown in FIG. 1, are constructing examples 11, performing multi-scale analysis 12 and reconstructing the HR image 13. The steps can be repeated in an iterative process.

The first step of constructing examples 11 generates a number of lower-resolution layers that will be used for multi-scale self-similarity analysis. The second step 12 performs the multi-scale self-similarity analysis, which basically includes a search for most similar patches across the several resolutions. The third step of reconstructing the HR image 13 obtains the reconstruction of a super-resolved layer by combination of the examples retrieved by the multi-scale analysis. Several lower-resolution scales of the input images are generated. For each image patch (e.g. 3×3 pixels) of the input image, the k closest matches in each lower scale are obtained. Typical values for k are k=1, k=2 or k=3, but k may be higher. The position and enclosing rectangle of each of these patches are enlarged to the scale of the original input image in order to generate examples for each patch in the input image in higher scales. The algorithm then proceeds in a coarse to fine manner by resizing the current highest layer, applying a deblurring step and synthesizing the high frequency detail by combining the overlapping high-frequency contributions of the examples obtained from the low-resolution image with inverse downscaling to the up-scaling of the current layer.

Next, details about the example construction 11 are described.

Given the input low-resolution image $L_0$, the desired magnification factor M and the cross-scale magnification C, the number of intermediate layers (for multi-scale analysis) is computed as $$N_L = \left\lfloor \frac{\log(M)}{\log(C)} \right\rfloor$$

Figure 2:
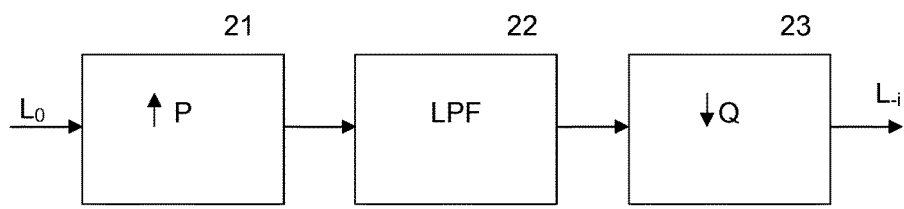
FIG. 2 a flow-chart of analytic resizing.

In one embodiment, the lower resolution layers $L_{-i, i=\{1, \ldots, N_L\}}$ are simply obtained by applying a resizing of the input image by a factor $(1/C)^i$. In one embodiment, this can be accomplished by analytic resampling, as shown in FIG. 2. In another embodiment, this can also be accomplished by kernel-based magnification, e.g. Bicubic resizing or Lanczos resizing.

In FIG. 2, a flow-chart of analytic resizing is shown. The analytic resizing comprises P zeros-insertion 21 (i.e. insertion of P zeros), ideal low-pass filtering (LPF) 22 and decimation 23 by a factor Q. This scheme generates each and any desired low-resolution layer when $P/Q=(1/C)^i$.

Next, details about the multi-scale analysis 12 are described.

Given a subdivision of the input image $L_0$ in overlapping patches with size 3×3 pixels (in one embodiment, while in other embodiments the patch sizes can be different), the goal of this stage is to find the k closest 3×3 patches to each patch from the input image in each layer $L_{-i}$. The location of each of these similar patches (once up-scaled by a factor C) determines the position of a larger patch of size $(3C^i) \times (3C^i)$ within the input image $L_0$ which can be used as a higher resolution example of the original patch. This point will be further described in more detail below, with respect to the reconstruction stage.

Figure 3:
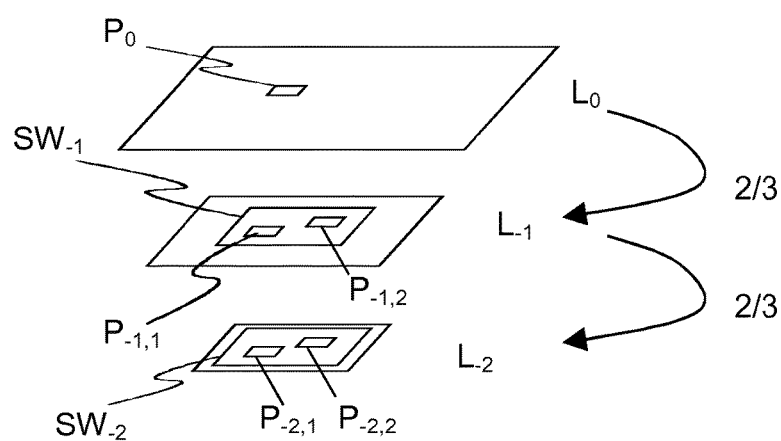
FIG. 3 multi-scale analysis for a desired magnification factor M=9/4 and cross-scale magnification C=3/2.

FIG. 3 shows graphically the main steps of the multi-scale analysis 12 for a desired magnification factor M=9/4 and cross-scale magnification C=3/2. The resulting number of layers $N_L$ is 2, in this example (since log (9/4)/log (3/2)=2). For each patch in $L_0$, the k=2 most similar patches in $L_{-i}$, for i={1, ..., $N_L$} are found within a search window by exhaustive search in each layer. Note that the number of most similar patches k is independent from $N_L$, the number of layers, although in this example both are 2. That is, for each 3×3 patch in $L_0$, the k=2 nearest patches are found with respect to the normalized L1-norm, i.e. the sum of absolute differences (SAD) for the three color channels (RGB) divided by the number of contributions (3×3×3=27 in case of RGB). The search for the closest patches is not conducted over the whole images, but rather over a search windows of size W×W, with e.g. W=41. Other search window sizes can be used, including non-square search windows of size $W_1 \times W_2$ (with $W_1 \neq W_2$). Given a position $(x_0, y_0)$ for the center of the input patch of $L_0$, the center of the search window is defined as $(x_{-i}, y_{-i}) = (x_0 (1/C)_i, y_0 (1/C)^i)$. The positions of the k most similar matches in each layer (lowest SAD) constitute the result of the multi-scale analysis.

For the example shown in FIG. 3, for a patch $P_0$ in a layer $L_0$, the two most similar patches $P_{-1,1}$ and $P_{-1,2}$ in the lower layer $L_{-1}$ are found within a search window $SW_{-1}$, and the two most similar patches $P_{-2,1}$ and $P_{-2,2}$ in the even lower layer $L_{-2}$ are found within a search window $SW_{-2}$. In one embodiment, both search windows $SW_{-1}$ and $SW_{-2}$ have equal size.

The implemented algorithm performs an exhaustive search over a window. Localizing the search with a window (i.e. limiting the search space to the search window) allows avoiding spending computing cycles in far regions with very low likelihood of containing similar structures (in scales similar to the input image) and extend the search to larger relative areas within the image for different scales (further away from that of the input image), which could contain similar structures at different scales by effect of the perspective.

Other embodiments, which may have lower resulting quality, apply approximate global search for best patches instead of the exhaustive localized search explained above. In this case, the so-called Approximate Nearest Neighbors (ANN) approach may be used.

Next, details about the HR reconstruction step 13 are described.

Figure 4:
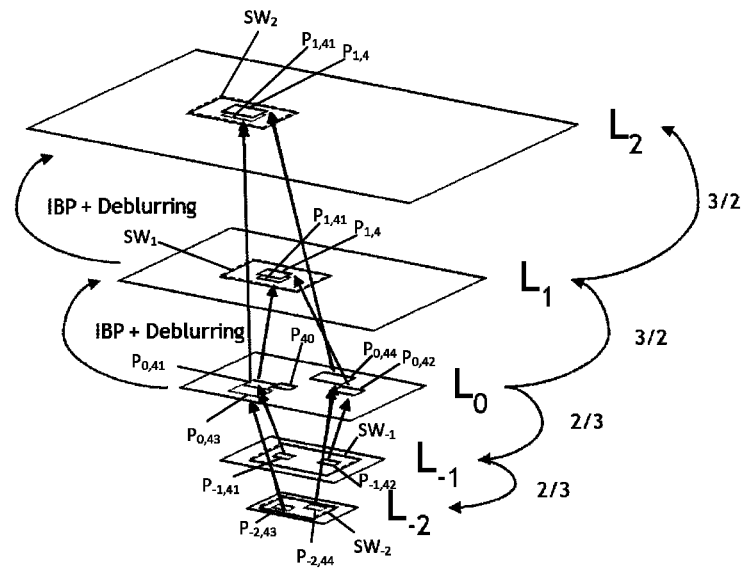
FIG. 4 the principle of reconstruction as used at the Reconstruction stage.

The overall mechanism of one embodiment of the reconstruction stage is depicted in FIG. 4. It shows an embodiment of the reconstruction stage that considers full-spectrum examples and requires IBP in order to ensure consistency of the lower band of the spectrum. FIG. 4 illustrates the initialization of each layer by resizing and deblurring the secondary search mechanism for the optimal allocation of the examples resulting from multi-scale analysis and the superposition of the k=2 nearest examples from different layers.

The algorithm is applied layer by layer, starting from $L_0$. First, $L_0$ is resized by the cross-scale magnification factor C (e.g. 3/2 in this example) and deblurred with L1 data cost (also known as "Manhattan norm" cost—note that the L1 data cost is not the $L_1$ image layer) and Total Variation (TV) regularization (i.e. a cost function such as $D(L1)+\lambda R$), resulting in an initial estimate of the layer $L_1$. For a current patch $P_{40}$ in $L_0$, k best matches from $L_1$ are searched (in this example, k=2, but k can be different, e.g. in the range of 1-10). For example, the found best-matching patches are denoted $P_{-1.41}$ and $P_{-1.42}$ in FIG. 4. Then, the position of the k best matches from $L_{-1}$ are projected to the scale of the initial image $L_0$. Thus, larger patches $P_{0.41}$, $P_{0.42}$ on corresponding positions are found in the initial image $L_0$. The corresponding larger patch of rounded size 5×5 located at (or, in one embodiment, starting at) the projected position is first cropped (by discarding the outermost pixels of at least one edge of the patch), and then matched against the initialized $L_1$ over a small search window of size $W_s \times W_s$ (with e.g. $W_s=5$) that is centered at the projected position of the center of the input patch to the scale of the current image $L_1$. The best matching position is taken as the target position for the example. An advantage of the cropping is that patch edge pixels, which are possibly undesired due to rounding, are removed. With the described mechanism, correct alignment of the examples is ensured that is free from rounding errors. This is especially useful when the cross-scale magnification factor C is non-integer.

In general, only patches with cost (according to a cost function, e.g. the cost function mentioned above) lower than a predefined threshold th are accepted as best matching patches, rather than all the k neighbors. In one embodiment, the threshold for the $L_{-1}$ layer's SAD cost is th=0.08. In one embodiment, the threshold is decreased for each successive layer. This reflects the fact that the likelihood that slightly dissimilar patches are actually leading to good examples is decreasing with the magnification factor. In one embodiment, the threshold decrease is 0.02 per successive layer (keeping in mind that cost thresholds cannot be negative, so that a minimum threshold is zero).

In this embodiment, Iterative Back-Projection (IBP) is used to ensure the spectral compatibility of layers $L_1$ and $L_{i-1}$. The procedure is repeated until reaching $L_{NL}$, where $N_L$ is the total number of layers.

FIG. 4 shows an embodiment with iterative repetition. In a first iteration, a first high-resolution layer $L_1$ is obtained. In a second iteration, a second high-resolution layer $L_2$ is obtained. In the depicted example, HR overlay patches $P_{1.41}$, $P_{1.42}$ for the second high-resolution layer $L_2$ are obtained from the input image $L_0$. In another embodiment, HR overlay patches for the second high-resolution layer $L_2$ can also be obtained from the first high-resolution layer $L_1$ and/or from lower layers $L_0, L_1, L_2$.

In an alternative embodiment, which is described in the following, the usage of IBP is omitted. This embodiment uses High-frequency synthesis, so that no problem of spectral compatibility between different layers $L_1$ and $L_{i-1}$ occurs.

Next, High-frequency synthesis is described.

Figure 5:
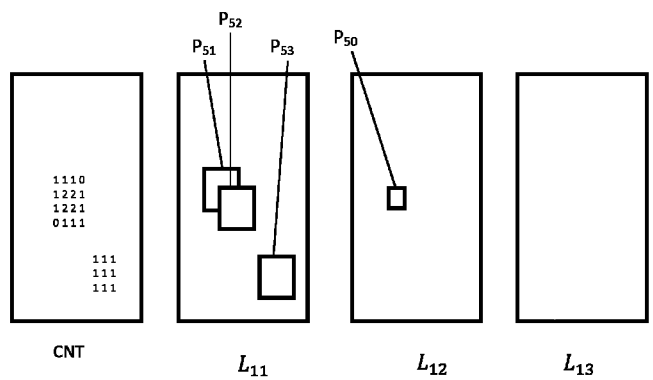
FIG. 5 how overlapping contributions to layer $L_1$ are stored in different layers.

In this embodiment, the problem of super-resolving each intermediate layer $L_i$ is treated as the reconstruction of the missing high-frequency band. By resizing a layer $L_{i-1}$ by a factor C, the filled-in bandwidth of layer $L_i$ is 1/C. In order to exploit this, the input $L_0$ layer is further analyzed. This is done differently for the low-frequency band $LF_0$ (with bandwidth 1/C) and the corresponding high-frequency band ($HF_0=L_0-LF_0$). For this purpose, the same filter or interpolating kernel as for creating the lower layers $L_{-i}$ and the upscaled layers $L_i$ is used. In this embodiment, IBP is not used. This is advantageous since IBP leads to ringing artifacts, which decrease image quality or need additional treatment. Such treatment can therefore be omitted. In this embodiment, the examples are not directly the cropped larger patches from $L_0$, but rather cropped patches from $HF_0$. The corresponding low-frequency band from $LF_0$ is used for looking for the target position in $L_i$. Then, the high-frequency examples are accumulated in their target positions (as illustrated in FIG. 5) with overlapping, a filter is applied on the overlapped contributions and the low-pass band is subtracted from the resulting high-frequency band before adding it to the initial $L_i$. In one embodiment, the filter that is applied on the overlapped contributions is an averaging filter. In another embodiment, the filter that is applied on the overlapped contributions is a median filter. This has the advantage that it performs better than average filtering.

In one embodiment shown in FIG. 5, overlapping contributions $P_{51}, P_{52}$ to layer $L_1$ are stored in different layers $L_{11}, \ldots, L_{13}$. Then, the reconstruction is obtained by means of median, average or weighted average of the contents contained in the three layers. The number of patches contributing to each pixel is stored in a count layer CNT operating as a counter. Exemplarily, the contributing patches $P_{51}, P_{52}$ each have a size of 3×3 pixels. Each number shown in the count layer CNT refers to a single pixel of the target layer (remaining pixels are zero and are not shown). E.g., one layer $L_{11}$ represents all used pixels (getting a weight of at least 1), and the second layer $L_{12}$ represents doubly used pixels (increasing their weight to 2). The marked area $P_{50}$ in the second layer $L_{12}$ represents the overlap of the two patches $P_{51}, P_{52}$. The third layer $L_{13}$ may represent further weights, e.g. areas of three overlapping patches. In practice, up to N×N layers must be considered, where N is the size of the contributing example. In the example shown in FIG. 5, the pixels of the target layer are obtained as follows: E.g. a pixel at a position of the upper left corner of the patch $P_{51}$ is stored in the first layer $L_{11}$. The count layer CNT has a value of 1 stored for this position. When reconstructing the target layer, each position is searched in the count layer CNT. For the above-mentioned position, it is determined from the count layer that there is only one contribution, and the pixel value of the target layer at that position is obtained from the first layer $L_{11}$. On the other hand, pixels at positions of patch overlaps are reconstructed as follows: e.g. a pixel at a position of the upper left corner of the patch $P_{52}$ is stored in the first layer $L_{11}$. It replaces a pixel of the previously found patch $P_{51}$, which is moved to the second layer $L_{12}$. The second layer $L_{12}$ has a "secondary patch" $P_{50}$ with only such "overlapped" pixel values stored, and the count layer CNT has a value of 2 stored for each of these positions. When reconstructing the target layer, e.g. at the position of the upper left corner of the patch $P_{52}$, it is determined from the count layer CNT that there are two contributions for this position, and the pixel value of the target layer at that position is obtained from the first layer $L_{11}$ and the second layer $L_{12}$. Higher layers $L_{13}, \ldots$ are used where more patches overlap. In one embodiment, the layers $L_{11}, L_{12}, L_{13}, \ldots$ are implemented as two or more (up to $N^2$) separate buffers. In a similar embodiment, the layers $L_{11}, L_{12}, L_{13}, \ldots$ are implemented as a single buffer that can store up to $N^2$ pixel values per position. These embodiments are flexible in how different pixel values at any particular position are combined, since all pixel values are stored. In yet another embodiment, the layers $L_{11}, L_{12}, L_{13}, \ldots$ are implemented as a single buffer that can store only one pixel values per position, and therefore accumulates pixel values at each position. This embodiment allows reconstruction of a pixel only from the sum of contributing pixels, which may be averaged by division by the count value at its corresponding position.

Figure 6:
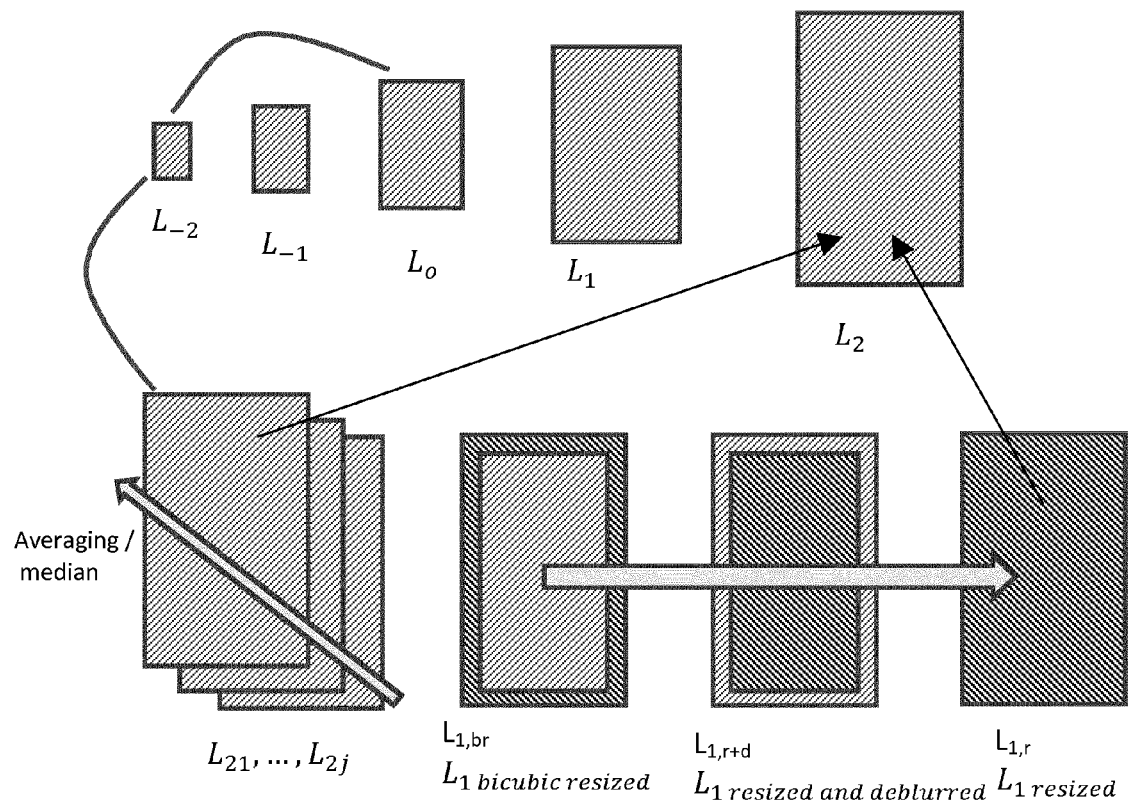
FIG. 6 a schematic view of the composition of the contribution of the examples and the resized version of the previous layer.

FIG. 6 depicts a schematic view of one embodiment of the composition of the contribution of the examples and the resized version of the previous layer. This embodiment is advantageous for improving edges of the image. Exemplarily, the reconstruction of a higher resolution layer $L_i$ is shown (i=2 in this example), given the previous highest layer $L_{i-1}$ and the set of examples of the downscaled layer $L_{-i}$. The contents of layer $L_i$ are determined by first initializing the layer and then adjusting each pixel. The initializing comprises resizing the former layer $L_{i-1}$ by a factor C and deblurring it. In one embodiment, the resized layer $L_{1,r}$ is obtained by using pixels from a bicubic resized layer $L_{1,br}$ for pixels near edges, and using pixels from a resized and deblurred layer $L_{1,r+d}$ in other positions. In this embodiment, contours are treated separately by standard resizing, without deblurring the edges of the image and adding the information learnt from the multi-scale search $(L_{i1}-L_{ij})$. This avoids contour-derived artifacts. The adjusting of pixels uses multiple layers $L_{21}, \ldots, L_{2j}$, as described above with respect to FIG. 5.

In one embodiment, the algorithm is applied only once. In one embodiment, the algorithm is applied iteratively more than once, which results in Iterative reconstruction. That is, for each new layer, the multi-scale analysis is performed taking the previous one as the new $L_0$. This has the advantage that an increased amount of examples in the higher layers is available, which are far from the initial scale so that normally the set of examples will be reduced.

Figure 7:
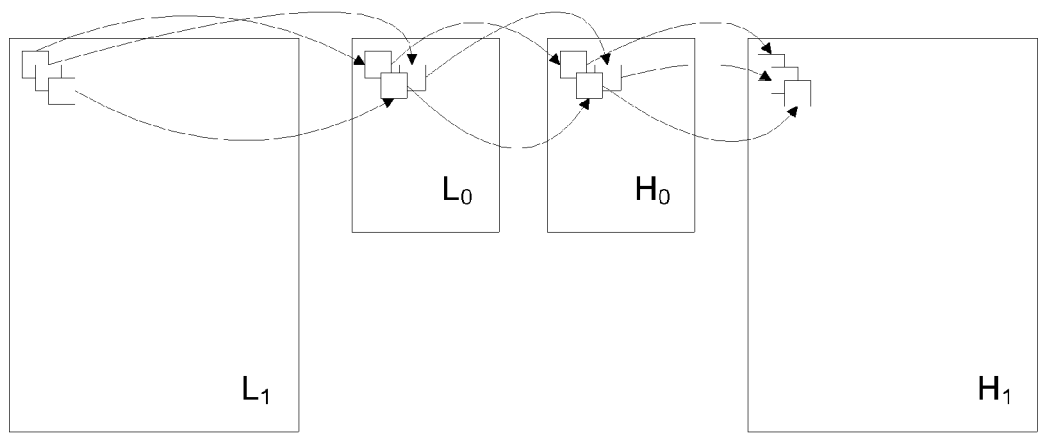
FIG. 7 a schematic view of the synthesis of the high-frequency band of the super-resolved image by extrapolation of the high-frequency information of similar patches at the original resolution scale.
Figure 8:
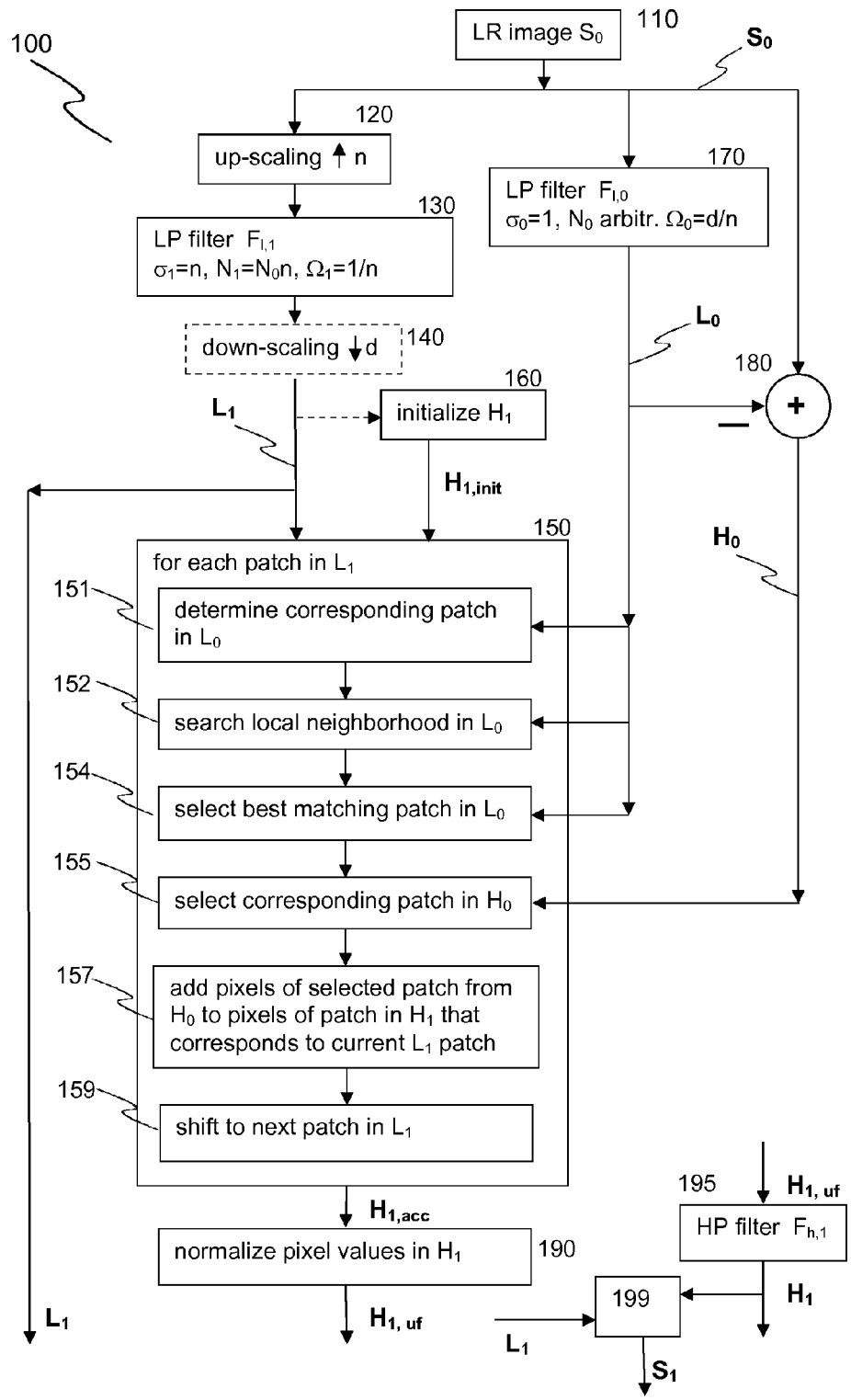
FIG. 8 a flow-chart of a method for performing spatial super-resolution processing.
Figure 9:
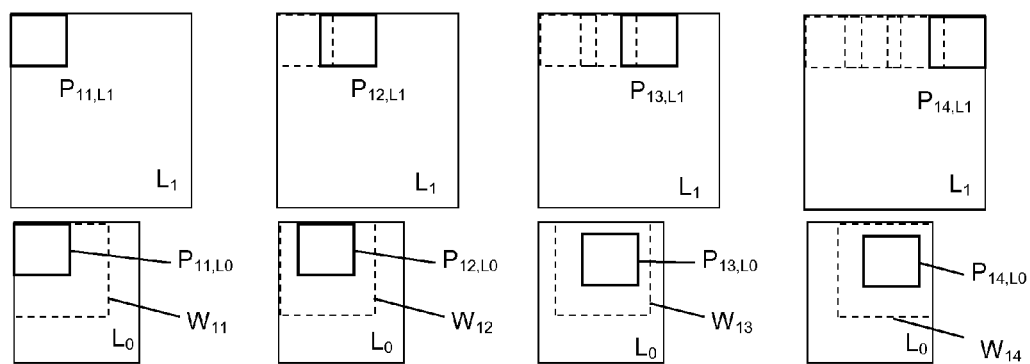
FIG. 9 exemplary usage and positions of a search window.
Figure 9:
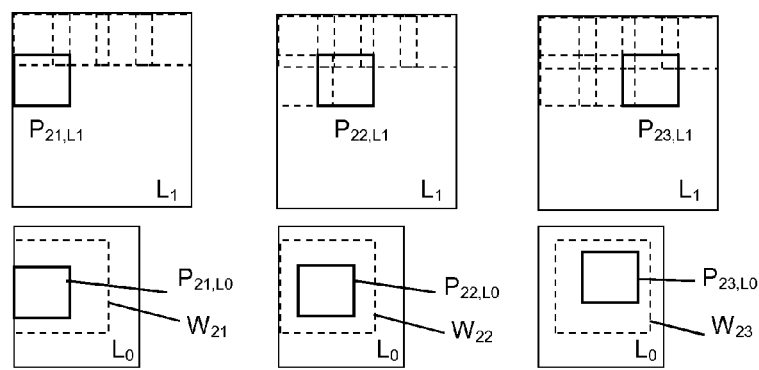

FIGS. 7-9 show more details about the above-mentioned embodiment that omits IBP due to the use of high-frequency synthesis.

FIG. 7 shows synthesis of the high-frequency band of the super-resolved image by extrapolation of the high-frequency information of similar patches at the original resolution scale. For each patch in an upscaled low frequency image $L_1$, its position is memorized, and a most similar patch in the original low-resolution image $L_0$ is determined. At the same position, a patch in the original initial resolution image $H_0$ is extracted, in order to be used for reconstructing a high-resolution image $H_1$. The extracted patch from $H_0$ is placed in the high-frequency high-resolution image $H_1$ at the memorized position where the patch of the upscaled low frequency image $L_1$ was.

The concept can be generalized from images to general digital data structures. FIG. 8 depicts a flow-chart of a method for performing spatial super-resolution processing of a low resolution input data structure $S_0$ of digital 1D, 2D or 3D data, in an embodiment of the present invention. In this embodiment, the method comprises steps of filtering 170 the input data structure $S_0$ by a first low-pass filter $F_{l,0}$, wherein a low-frequency (LF) input data structure $L_0$ is obtained, calculating in an adder/subtractor 180 a difference between the input data structure $S_0$ and the LF input data structure $L_0$, whereby a high-frequency (HF) input data structure $H_0$ is generated, upscaling 120 the input data structure $S_0$, and filtering 130 the upscaled input data structure by a second low-pass filter $F_{l,1}$, wherein a LF upscaled data structure $L_1$ is obtained, determining in the LF upscaled data structure $L_1$ a first patch $P_{n,L1}$ at a first position, searching 151,152,154 in the LF input data structure $L_0$ a first block $B_{n,L0}$ that matches the first patch $P_{n,L1}$ best, and determining the position of said first block $B_{n,L0}$ within the LF input data structure $L_0$, selecting 155 a second block $B_{n,H0}$ in the HF input data structure $H_0$ at the determined position, accumulating 157 data values (e.g. pixel data) of the selected second block $B_{n,H0}$ to a second patch $P_{n,H1}$, the second patch being a patch in a high-frequency upscaled data structure $H_{1,acc}$ at the first position (that was determined above for the first patch $P_{n,L1}$), repeating 150 the steps of determining a new patch $P_{n,L1}$ in the LF upscaled data structure $L_1$, searching 151,152,154 in the LF input data structure $L_0$ a block $B_{n,L0}$ that matches the selected patch $P_{n,L1}$ best, selecting 155 a corresponding block $B_{n,H0}$ in the HF input data structure $H_0$ and accumulating 157 pixel data of the selected corresponding block $B_{n,H0}$ to a patch $P_{n,H1}$ in the HF upscaled data structure $H_{1,acc}$ at the position of said new patch $P_{n,L1}$, and normalizing 190 the accumulated pixel values in the HF upscaled data structure $H_{1,acc}$, whereby a normalized HF upscaled data structure $H_1$ is obtained. Finally, a super-resolved data structure $S_1$ is obtained by adding the normalized HF upscaled data structure $H_1$ to the LF upscaled data structure $L_1$.

In some embodiments, the upscaled input data structure after filtering 130 by the second low-pass filter $F_{l,1}$ is downscaled 140 by a downscaling factor d, with n>d. Thus, a total non-integer upscaling factor n/d is obtained for the low-frequency upscaled data structure $L_1$. The high-frequency upscaled data structure $H_{1,init}$ (or $H_1$ respectively) has the same size as the low-frequency upscaled data structure $L_1$. The size of $H_1$ may be pre-defined, or derived from $L_1$. $H_1$ is initialized in an initialization step 160 to an empty data structure $H_{1,init}$ of this size.

FIG. 9 depicts exemplary usage and positions of a search window within the low-resolution low-frequency data structure $L_0$. For a first patch $P_{11,L1}$ a first best matching block $P_{11,L0}$ is searched in $L_0$ within a first search window $W_{11}$. Both patches have the same size. The search window is larger than the patch by at least one value in each direction (except on edges, as for the first patch). In one embodiment, the size of the search window is 4-6 times the size of the determined patch (before cropping). In the example shown in FIG. 9, the first best matching block $P_{11,L0}$ is found in $L_0$ in the upper left corner of the first search window $W_{11}$. The further process for this patch and block is as described above. Then, subsequent patches are shifted horizontally and/or vertically, wherein each patch overlaps a previous patch. In an embodiment of the present invention, the search is extended to neighboring frames (either a direct neighbor or a direct neighbor's direct neighbor, i.e. a frame range of ±1 frame or ±2 frames is searched).

In the example shown in FIG. 9, a second patch $P_{12,L1}$ is selected at a position that is shifted horizontally by a given patch advance. Patch advance is the difference between patch size and overlap. Patch advances in different dimensions (e.g. horizontal and vertical for 2D data structures) may differ, which may lead to different effects or qualities in the dimensions of the high-resolution output data structure, but they are usually equal. A new search window $W_{12}$ is determined according to the new patch position. In principle, the search windows advance in the same direction as the patch, but slower. Thus, a current search window may be at the same position as a previous search window, as is the case here. However, since another patch $P_{12,L1}$ is searched in the search window, the position of the best matching patch $P_{12,L0}$ will usually be different. The best matching patch $P_{12,L0}$ is then accumulated to the high-resolution high-frequency data structure $H_1$ at the position of the low-frequency high-resolution patch $P_{12,L1}$, as described above. Subsequent patches $P_{13,L1}$, $P_{14,L1}$ are determined and their best matches are searched in the same way. As shown in FIG. 9, the position of the best matching block within the search window is arbitrary and depends on the input data (e.g. the image content).

The above description is sufficient for a 1-dimensional (1D) data structure. For 2D data structures, the position of a further subsequent patch is found by vertical patch advance (this may or may not be combined with a horizontal patch advance). Also vertical patch advance includes an overlap, as mentioned above and shown in FIG. 9 for $P_{21,L1}$, ..., $P_{23,L1}$.

The position of the search window is determined according to the position of the current patch. As shown in FIG. 9, the search windows $W_{11}$, ..., $W_{22}$ of different patches overlap. Since $L_0$ is a smaller data structure than $L_1$, the search window advance in each dimension is very small. In one embodiment, the search windows are on the edge of $L_0$ if their corresponding patch is on an edge of $L_1$, and it is uniformly and/or proportionally moved in between these edges.

In one embodiment (not shown in FIG. 9), the center of the search window is set at a position that is substantially proportional to the center of the patch. E.g. where the center of a patch is at 3% of the high-resolution data structure $L_1$, the center of the search window is set to be at approximately 3% (rounded) of the low-resolution data structure $L_0$. In this case, for patches near an edge, the search window size may be reduced, or the search window may be shifted completely into the low-resolution data structure $L_0$.

In one embodiment, the present invention comprises generating an initial version of the super-resolved (SR) image from a low-resolution input image, searching, for each patch of the input image, similar low-resolution (LR) patches in down-sampled versions of the input image, wherein the searching is performed within first search windows, determining, in less down-sampled versions of the input image, high-resolution (HR) patches that correspond to the similar LR patches, cropping the determined HR patches, determining a second search window in the initial version of the SR image, searching, within the second search window, a best-matching position for each cropped HR patch, and adding each cropped HR patch at its respective best-matching position to the SR image. As a result, the initial SR image is enhanced by the detail information that comes from the added patches.

For generating an initial version of the super-resolved image, any conventional upsampling of the input image can be used.

In various embodiments, important features of the invention are the following: Simple conventional upsampling/upscaling is used for generating the initial version of the super-resolved image (i.e. higher layer). Multiple (at least two) down-scaled versions are generated as lower layers. HF/detail information patches are obtained from the lower layer images, using a first search window in each lower layer image. A fixed number k of patches (k-Nearest Neighbours, KNN) is obtained from each lower layer image. Found patches are cropped, and the cropped patches are overlaid to the initial version of the super-resolved image. Cropping includes removing pixels of at least one edge of the patch. E.g., the cropping of a 5×5 pixel patch results in a 5×4 pixel cropped patch, or a 3×3 pixel cropped patch. When overlaying the cropped patches to the initial version of the super-resolved image, the overlay position is determined within a second search window. In one embodiment, the second search window has the size of the patch before cropping, e.g. 5×5 pixels. In another embodiment, the second search window is slightly larger, e.g. 6×6 pixels (square), or 5×6, 5×7 or 6×7 pixels (non-square). In yet another embodiment, the second search window is slightly smaller, e.g. 4×4 pixels (square), or 4×5 pixels (non-square). If only one edge of the patch was cropped, the search within the second search window is very simple.

In one embodiment, a method for generating a super-resolved image $L_1$ from a low-resolution input image $L_0$ comprises steps of
generating an initial super-resolved image by upsampling the input image,
generating multiple down-scaled versions of the input image,
searching in first search windows within the down-scaled versions of the input image for patches similar to patches of the input image, searching corresponding upscaled patches, cropping the upscaled patches, and adding/overlaying the cropped upscaled patches to the initial super-resolved image, wherein the position of the cropped upscaled patches is determined within second search windows.

In one embodiment, a device for generating a super-resolved image $L_1$ from a low-resolution input image $L_0$ comprises
an upsampling module for generating an initial super-resolved image by upsampling the input image,
one or more down-scaling modules for generating multiple down-scaled versions of the input image,
a first search module for searching in first search windows within the down-scaled versions of the input image for patches similar to patches of the input image, a patch projection module for searching corresponding upscaled patches, a cropping module for cropping the upscaled patches, and a pixel overlay module for adding/overlaying the cropped upscaled patches pixel-wise to the initial super-resolved image, wherein the position of the cropped upscaled patches is determined within second search windows.

While there has been shown, described, and pointed out fundamental novel features of the present invention as applied to preferred embodiments thereof, it will be understood that various omissions and substitutions and changes in the apparatus and method described, in the form and details of the devices disclosed, and in their operation, may be made by those skilled in the art without departing from the spirit of the present invention. It is expressly intended that all combinations of those elements that perform substantially the same function in substantially the same way to achieve the same results are within the scope of the invention. Substitutions of elements from one described embodiment to another are also fully intended and contemplated.

It will be understood that the present invention has been described purely by way of example, and modifications of detail can be made without departing from the scope of the invention. Each feature disclosed in the description and (where appropriate) the claims and drawings may be provided independently or in any appropriate combination. Features may, where appropriate be implemented in hardware, software, or a combination of the two. Connections may, where applicable, be implemented as wireless connections or wired, not necessarily direct or dedicated, connections.

Reference numerals appearing in the claims are by way of illustration only and shall have no limiting effect on the scope of the claims.

CITED REFERENCES

J. Yang, J. Wright, T. Huang, and Y. Ma, *Image Super-resolution via Sparse Representation*, IEEE Trans, on Image Processing, pp. 2861-2873, vol. 19, issue 11, May 2010

D. Glasner, S. Bagon, and M. Irani, *Super-Resolution form a Single Image*, ICCV 2009

The invention claimed is:

1. A method for generating a super-resolved image from a low-resolution input image, comprising:
    generating an initial super-resolved image by upsampling the input image;
    generating multiple down-scaled versions of the input image;
    searching in first search windows within the down-scaled versions of the input image for patches similar to patches of the input image;
    searching, for each patch that is found within a first down-scaled version of the input image and that is similar to a patch of the input image, a corresponding upscaled patch within a second down-scaled version of the input image that is larger than the first down-scaled version of the input image;
    cropping the upscaled patches, wherein the outermost pixels of at least one edge of the upscaled patches are discarded; and
    adding the cropped upscaled patches to the initial super-resolved image, wherein a weighted combination of the cropped upscaled patches to the initial super-resolved image is generated, and wherein the position of the cropped upscaled patches is determined within second search windows that are centred at projected positions of the centres of their corresponding patches of the input image to the scale of the initial super-resolved image.

2. The method of claim 1, wherein
    the generated down-scaled versions of the input image are at different scales;
    the input image is separated into a plurality of overlapping patches and for the patches of the input image,
    said searching in first search windows, for a current patch of the input image, further comprising determining a corresponding position in the initial super-resolved image;
    said searching corresponding upscaled patches further comprising:
        searching, for the current patch of the input image k most similar patches within a first search window in each down-sampled version of the input image, k being a pre-defined number and k being one or more;
        determining for each found patch being one of said k most similar patches in any particular down-sampled version of the input image, a patch at a corresponding position in a different version of the input image that has the next higher resolution than the particular down-sampled version; and
        defining a second search window within the initial super-resolved image, the second search window being around said determined position corresponding to the current patch;
    said cropping the upscaled patches further comprising cropping each determined patch from said different version of the input image, wherein pixels of at least one edge of the patch are removed;
    said adding the cropped upscaled patches to the initial super-resolved image further comprising
        searching for each determined and cropped patch a best-matching position within the second search window, wherein the determined patches are compared with a portion of the initial super-resolved image that is within the second search window; and
        adding each determined and cropped patch to the initial super-resolved image at the best-matching position.

3. The method according to claim 1, wherein the second search window has the same size as each determined patch from said different version of the input image, before the cropping.

4. The method according to claim 1, wherein the size of the first search window is 4-6 times the size of each determined from said different version of the input image, before the cropping.

5. The method according to claim 1, wherein said generating an initial super-resolved image by upsampling the input image further comprises determining the contents of the higher layer by resizing the lower layer by a factor C and then deblurring the resized lower layer.

6. An apparatus for generating a super-resolved image from a low-resolution input image, comprising:
    at least one processor connected to an associated memory, the at least one processor being configured to:
    generate an initial super-resolved image by upsampling the input image;
    generate a plurality of down-sampled versions at different scales of the input image;
    separate the input image into a plurality of overlapping patches;
    search for a current patch of the input image, k most similar patches within a first search window in each down-sampled version of the input image, k being a pre-defined number;
    determine for each found patch being one of said k most similar patches in any particular down-sampled version of the input image, a patch at a corresponding position in a less down-sampled version of the input image;
    define a second search window within the initial super-resolved image, the second search window being around a position that corresponds to the position of the current patch of the input image;
    crop each determined patch from said less down-sampled version of the input image, wherein pixels of at least one edge of the patch are removed;
    search for each determined and cropped patch, a best-matching position within the second search window, wherein the determined patches are compared with a portion of the initial super-resolved image that is within the second search window; and
    add each determined and cropped patch to the initial super-resolved image at the best-matching position, wherein a weighted combination of the cropped upscaled patches to the initial super-resolved image is generated, and
    determine the position of the cropped patches within second search windows that are centred at projected positions of the centres of their corresponding patches of the input image to the scale of the initial super-resolved image.

7. The apparatus of claim 6, wherein the processor is further configured to determine a first search window in each down-sampled version of the input image.

8. A non-transitory computer readable storage medium having executable instructions to cause a computer to perform a method for generating a super-resolved image from a low-resolution input image, comprising
   generating an initial super-resolved image by upsampling the input image;
   generating multiple down-scaled versions of the input image;
   searching in first search windows within the down-scaled versions of the input image for patches similar to patches of the input image;
   searching corresponding upscaled patches;
   cropping the upscaled patches; and
   adding the cropped upscaled patches to the initial super-resolved image, wherein a weighted combination of the cropped upscaled patches to the initial super-resolved image is generated, and wherein the position of the cropped upscaled patches is determined within second search windows that are centred at projected positions of the centres of their corresponding patches of the input image to the scale of the initial super-resolved image.

9. The non-transitory computer readable storage medium of claim 8, wherein
   the generated down-scaled versions of the input image are at different scales;
   the input image is separated into a plurality of overlapping patches; and for the patches of the input image,
   said searching in first search windows, for a current patch of the input image, further comprising determining a corresponding position in the initial super-resolved image;
   said searching corresponding upscaled patches further comprising:
      searching, for the current patch of the input image, k most similar patches within a first search window in each down-sampled version of the input image, k being a pre-defined number and k being one or more;
      determining, for each found patch being one of said k most similar patches in any particular down-sampled version of the input image, a patch at a corresponding position in a different version of the input image that has the next higher resolution than the particular down-sampled version; and
      defining a second search window within the initial super-resolved image, the second search window being around said determined position corresponding to the current patch;
   said cropping the upscaled patches further comprising cropping each determined patch from said different version of the input image, wherein pixels of at least one edge of the patch are removed;
   said adding the cropped upscaled patches to the initial super-resolved image further comprising:
      searching for each determined and cropped patch a best-matching position within the second search window, wherein the determined patches are compared with a portion of the initial super-resolved image that is within the second search window; and
      adding each determined and cropped patch to the initial super-resolved image at the best-matching position.

10. The non-transitory computer readable storage medium of claim 8, wherein the second search window has the same size as each determined patch from said different version of the input image, before the cropping.

11. The non-transitory computer readable storage medium of claim 8, wherein the size of the first search window is 4-6 times the size of each determined from said different version of the input image, before the cropping.

12. The non-transitory computer readable storage medium of claim 8, wherein in generating an initial super-resolved image by upsampling the input image, the contents of the higher layer are determined by resizing the lower layer by a factor C and then deblurring the resized lower layer.

* * * * *